(12) United States Patent
Hartke et al.

(10) Patent No.: US 6,326,895 B1
(45) Date of Patent: Dec. 4, 2001

(54) FLUID LEVEL SENSOR FOR FLUID TANKS OF BOATS

(75) Inventors: David J. Hartke, Gurnee; Richard P. Kolb, Prarie View, both of IL (US); James L. Holt, Colorado Springs, CO (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/561,724

(22) Filed: May 1, 2000

(51) Int. Cl.$^7$ ..................................................... G08B 21/00
(52) U.S. Cl. ......................... 340/612; 340/618; 340/623; 340/625; 73/290 R; 73/305; 73/307; 73/309; 73/311; 73/317
(58) Field of Search ..................................... 340/612, 618, 340/623, 625; 73/290 R, 305, 307, 309, 311, 314, 317

(56) References Cited

U.S. PATENT DOCUMENTS 1,391,146 * 9/1921 Tibbetts .
5,294,917 * 3/1994 Wilkins ................................. 340/625

* cited by examiner

Primary Examiner—Julie Lieu
(74) Attorney, Agent, or Firm—Timothy J. Ziolkowski

(57) ABSTRACT

A fluid level sensor for a fluid tank of a marine vessel is provided. The sensor includes a sensor mount and further includes a circuit housing that is pivotally connected to the mount to pivot about a predetermined pivot axis. A float assembly is configured to supply an actuating angle substantially impervious to fluid tank tilt and/or fluid splash at least along an axis generally perpendicular to the pivot axis. A circuit in the circuit housing is responsive to the actuating angle from the float assembly to provide an output signal indicative of the fluid level in the tank.

55 Claims, 3 Drawing Sheets

FLUID LEVEL SENSOR FOR FLUID TANKS OF BOATS

BACKGROUND OF THE INVENTION

This invention relates to a fluid level sensor and techniques for sensing fluid level in marine vessels, such as boats and other relatively small watercraft including jet-powered watercraft. More particularly, the present invention is related to a fluid level sensor and techniques that provide accurate fluid metering even when the boat is not operating in a horizontal plane and/or is subject to up/down rocking motion.

Many types of presently available watercraft are highly maneuverable during operation and although the high level of maneuverability is very pleasurable to the user, it may cause undesirable splash or slosh in fluids stored in fluid tanks, such as fuel and oil tanks. As will be understood by those skilled in the art, a control bridge including an instrument panel may be located forwardly of the seat where a boat operator is seated. The instrument panel may include a display or indication of fluid availability, such as fuel or oil. It will be apparent that it is desirable to obtain accurate and reliable readings of fluid availability, otherwise the boat and its occupants could be stranded on a body of water, or the user may unnecessarily spend time in refueling when not truly needed, etc.

One type of known device for detecting the fluid level in a fuel or oil tank of a boat includes a pivotal arm having a float at one end thereof. Fluctuation of the fluid level causes vertical displacement of the float so that the fluid level may be detected in reference to the angular orientation of the pivotal arm. While this type of device is generally satisfactory for large marine vessels, it is somewhat less suited for smaller vessels which are more strongly influenced by wind and waves. When this type of device is applied to small vessels, the float tends to vibrate or move when the fluid is agitated as a result of these wind and/or water forces which cause the small vessel to rock or move up and down. Further, boats are seldom operated in a horizontal plane, that is, during operation, the on-plane of the boat is generally bow high, e.g., four or more degrees, and thus the fluid tank may be tilted relative to local gravity which causes such device to give erroneous indications.

In view of the foregoing discussion, it is desirable to provide a fluid level sensor that provides accurate readings notwithstanding the presence of fluid tank tilt and/or fluid splash as the vessel is rocked up and down. It is also desirable to provide a kit that allows for accurate fluid metering and that quickly and reliably may be retrofitted at low cost in respective fleets of watercrafts.

BRIEF SUMMARY OF THE INVENTION

Generally speaking, the present invention fulfills the foregoing needs by providing a fluid level sensor for a fluid tank of a marine vessel. The sensor comprises a sensor mount. A circuit housing is pivotally connected to the mount to pivot about a predetermined pivot axis. A float assembly is configured to supply an actuating angle substantially impervious to fluid tank tilt and/or fluid splash at least along an axis generally perpendicular to the pivot axis. A circuit in the circuit housing is responsive to the actuating angle from the float assembly to provide an output signal indicative of the fluid level in the tank.

The present invention further fulfills the foregoing needs by providing a fluid metering system for a marine vessel. The metering system comprises a fluid tank having a mount therein. A circuit housing is pivotally connected to the mount to pivot about a predetermined pivot axis. A float assembly is configured to supply an actuating angle substantially impervious to fluid tank tilt at least along an axis generally perpendicular to the pivot axis. A circuit in the circuit housing is responsive to the actuating angle from the float assembly to provide an output signal indicative of the fluid level in the tank.

In yet another aspect of the present invention, the foregoing needs are further fulfilled by providing a method for sensing fluid level in a tank of a marine vessel. The method allows for pivotally connecting a circuit housing to a mount in the fluid tank to pivot about a predetermined pivot axis. The method further allows for generating an actuating angle substantially insensitive to fluid tank tilt and/or fluid splash at least along an axis generally perpendicular to the tilt axis. A circuit is situated in the circuit housing to be responsive to the actuating angle to provide an output signal indicative of the fluid level in the tank.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
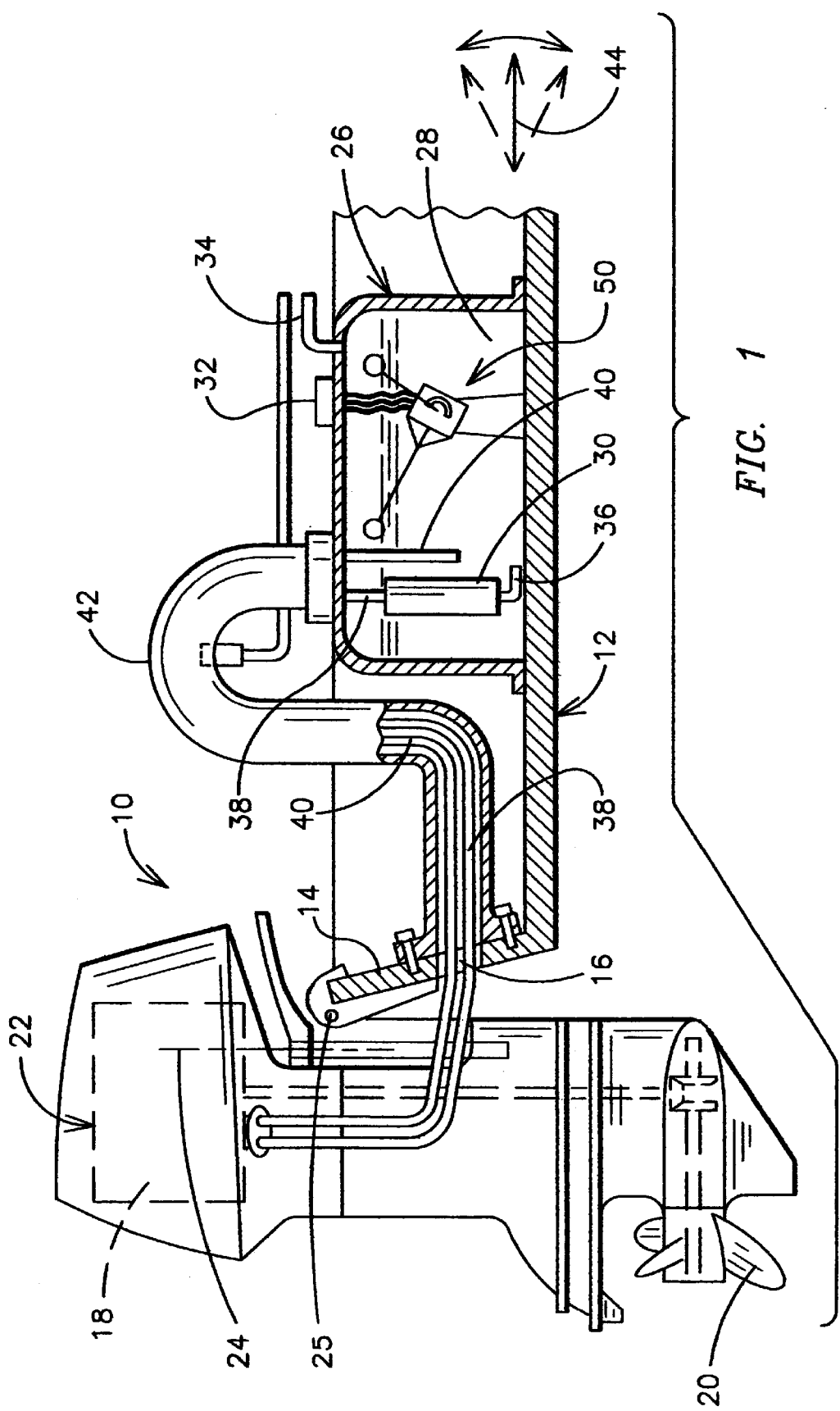
FIG. 1 is a schematic diagram of an exemplary boat propulsion system that may readily benefit from a fluid level sensor embodying the present invention.

FIG. 1 is a partially schematic view of an exemplary marine propulsion system 10 in a boat 12 having a transom 14 with an opening 16 therein. The system 10 includes a marine propulsion device including an engine 18, and a rotatably mounted propeller 20 driven by the engine 18. As shown in FIG. 1, the marine propulsion device is an outboard motor 22 pivotally mounted on the exterior of the transom 14 for pivotal movement relative to the transom 14 about a generally vertical steering axis 24, and about a generally horizontal tilt axis 25.

The marine propulsion system 10 also includes one or more sources of fluid, e.g., fuel, oil, etc., generally located interiorly of the boat 12. The source of fluid includes a conventional fluid tank 26 having an exterior and including a fluid chamber 28, and, in the case of a fuel delivery system, may include a pump 30 that may be mounted interiorly of the fuel tank 26 within the fuel chamber 28. The fuel tank 26 also includes a removable fill cap 32, and a conduit 34 for venting the fuel chamber 28 to the exterior of the boat 12. In the illustrated construction, the pump 30 is a submersible electric pump equipped with a fuel filter 36 which reaches to the bottom of the fuel chamber 28.

The marine propulsion system 10 also includes a flexible supply conduit 38 extending through the opening 16 in the transom 14 and communicating between the pump 30 and the engine 18. Thus, the pump 30 delivers fuel under pressure through the supply conduit 38 to the engine 18. The marine propulsion system 10 may further include a flexible return conduit 40 communicating between the engine 18 and the fuel chamber 28 for returning fuel not consumed by the engine 18 to the fuel chamber 28. The marine propulsion system 10 includes a fuel impermeable housing 42 connected to the exterior of the fuel tank 26 and surrounding the portions of the supply and return conduits 38 and 40 located interiorly of the boat 12. The ends of the housing conduit 42 are sealingly connected to the fuel tank 26 and to the interior of the transom 14, so that any fuel leaking into the housing conduit 42 cannot leak into the interior of the boat 12.

As shown in FIG. 1, inside fluid tank 26 is a fluid level sensor 50 that embodies the present invention. As discussed in greater detail below, sensor 50 supplies an output signal which is indicative of the level of fluid in fluid tank 26 and which is substantially insensitive to fluid tank tilt as the boat changes its on-plane orientation relative to the water surface as the boat is operated from zero speed to a desired cruising speed. The output signal from the fluid level sensor is further substantially insensitive to transient fluctuations in the fluid level in the tank due to wind, vibration, water waves, etc. Thus, it will be appreciated that sensor 50 is substantially impervious to fluctuations in fluid level due to up and down rocking motion of the boat along its longitudinal axis (e.g., axis 44). Such motion is represented in FIG. 1 by the arc extending between the tips of the phantom arrows adjacent to axis 44. The output signal from the fluid level sensor, after appropriate signal conditioning in an optional signal conditioning device 70 (FIG. 2), such as a microprocessor, using signal conditioning techniques well-understood by those of ordinary skill in the art, may be transmitted to a fluid level indicator 72 (FIG. 2) mounted on an instrument panel on the control bridge of the boat to indicate to the operator the amount of fluid available in the tank, and/or display a suitable alarm indication if the level of fluid in fluid tank 26 falls below a predetermined threshold level. The type of alarm indication could be visual, audible or combination of the two. It will be appreciated that sensor 50 is not limited to the exemplary boat propulsion system illustrated in FIG. 1 since sensor 50 may be used with any marine vessel propulsion system that uses a fluid tank for storing fluid. It will be further appreciated that the signal conditioning device need not be a microprocessor, and, as suggested above, in some basic applications the output signal from the sensor could be directly transmitted to a gauge with built-in mechanical damping, such as may be provided with a suitable dampening fluid, without needing any signal conditioning device 70.

Figure 2:
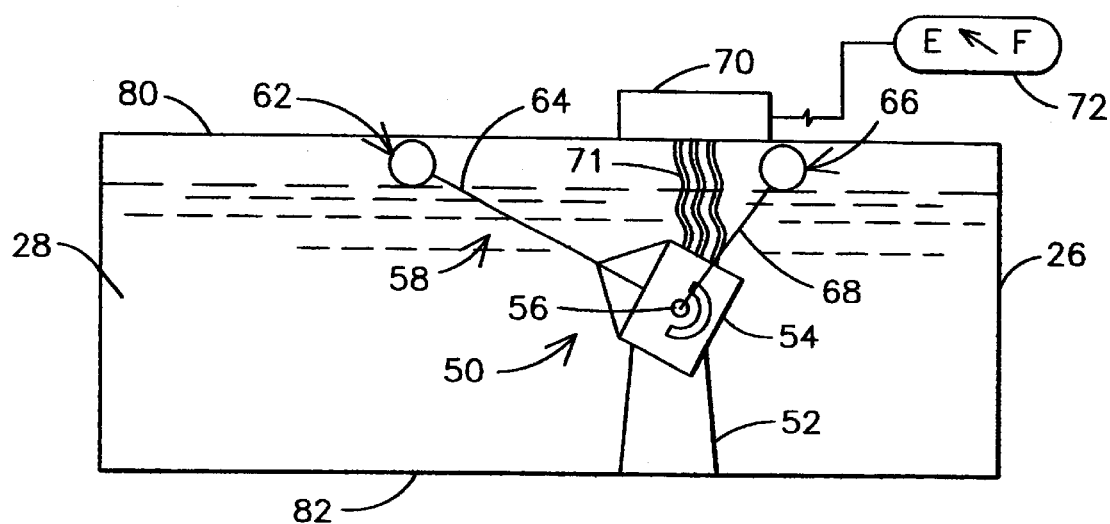
FIG. 2 is a schematic diagram of an exemplary embodiment of the sensor of the present invention illustrating respective positions of two floats when the fuel tank is substantially full and wherein the two floats cooperate to produce a circuit actuating angle which causes a circuit to generate a signal indicative of the fluid level.

FIG. 2 shows further details in connection with the fluid level sensor 50 shown in FIG. 1. As illustrated in FIG. 2, sensor 50 comprises a sensor mount 52 in the fluid tank for pivotally receiving a circuit housing 54 which pivots about a predetermined pivot axis 56. As shown in FIG. 2, mount 52 is affixed to a bottom surface 82 of tank 26 and comprises a sensor arrangement generally known in the art as a bottom-referenced sensor. It will be appreciated that the present invention is not limited to bottom-referenced arrangements since mount 52 could be mounted onto a top surface 80 of the tank in lieu of bottom surface 82. Further, if desired, mount 52 could be mounted onto the lateral walls of the tank.

A float assembly 58 is arranged to supply an actuating angle substantially impervious to fluid tank tilt and/or fluid splash at least along the axis generally perpendicular to the pivot axis 56. A circuit 60 in the circuit housing 54 is responsive to the actuating angle from float assembly 58 to provide an output signal indicative of the fluid level in the tank. As shown in FIG. 2, float assembly 58 is made up of a first float 62 having a respective arm 64 fixedly connected to circuit housing 54 to impart a housing angle that varies about pivot axis 56 as the level of fluid about first float 62 changes. In a preferred embodiment of the present invention, circuit 60 comprises a standard potentiometer having a respective rotatable arm. As is well-known in the art, the potentiometer comprises a resistor having a continuously adjustable sliding contact that is coupled to its rotatable arm and is used as a voltage divider. Float assembly 58 further comprises a second float 66 having a respective arm 68 connected to the rotatable arm of the potentiometer to impart a potentiometer arm angle that varies about pivot axis 56 relative to circuit housing 54 as the level of fluid about second float 66 changes.

Figure 3:
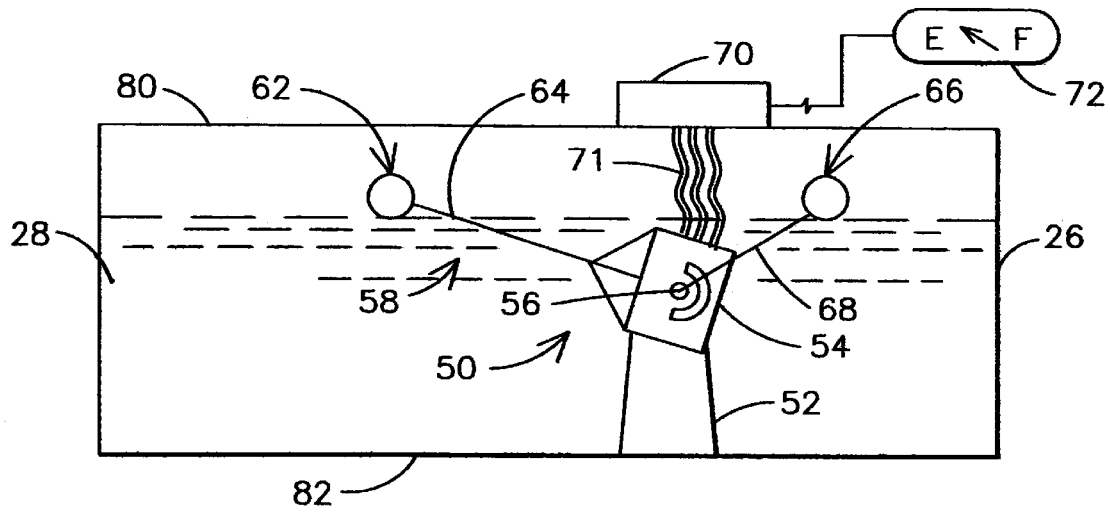
FIG. 3 is a schematic diagram of the sensor embodiment of FIG. 2 illustrating respective positions of the two floats when the fluid tank is partially full.
Figure 4:
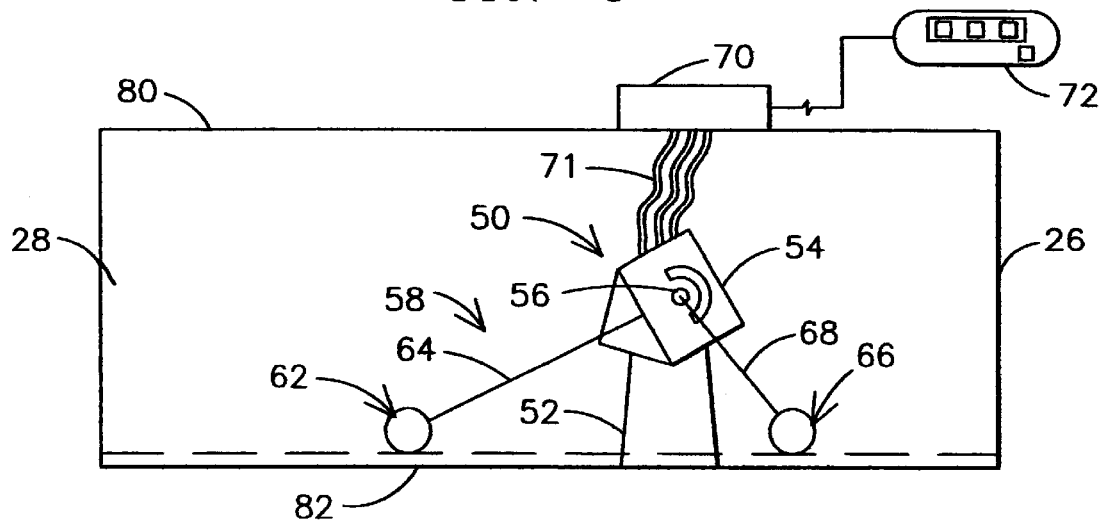
FIG. 4 is a schematic diagram of the sensor embodiment of FIG. 2 illustrating respective positions of the two floats when the fluid tank is substantially empty.
Figure 5:
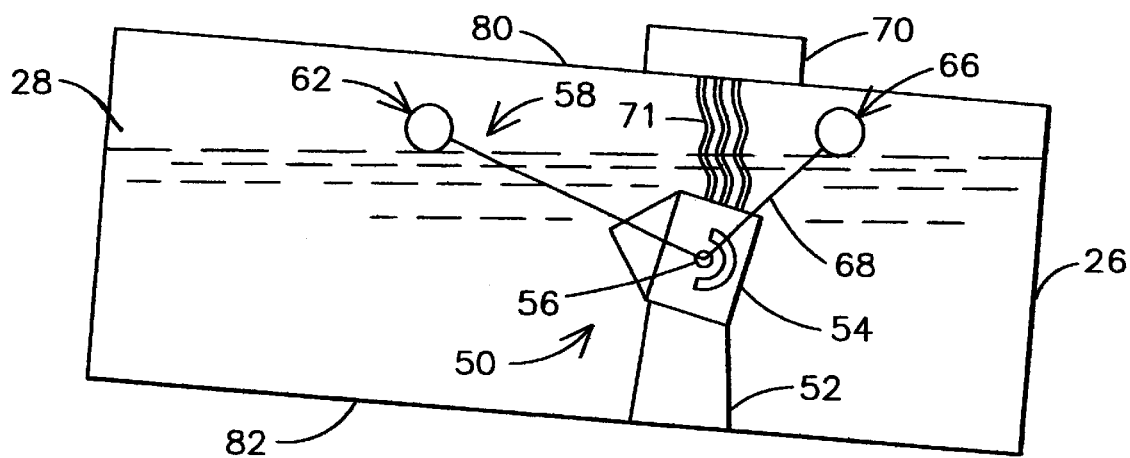
FIG. 5 is a schematic diagram of the sensor embodiment of FIG. 2 illustrating respective positions of the two floats when the fluid tank is tilted.
Figure 6:
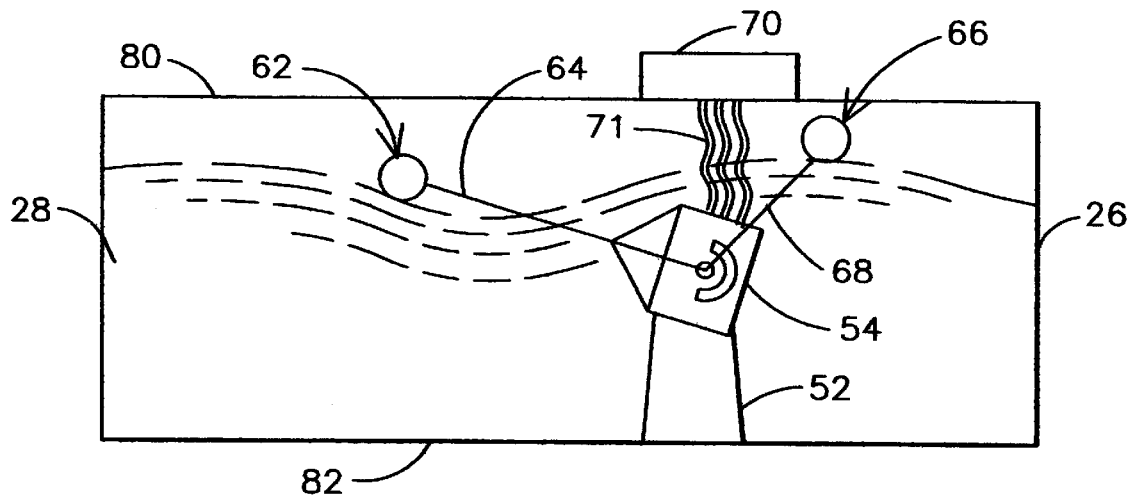
FIG. 6 is a schematic diagram of the sensor embodiment of FIG. 2 illustrating respective positions of the two floats when the fluid is being splashed in the fluid tank.

It will be appreciated that FIG. 2 illustrates a condition corresponding to a substantially full fluid tank, while FIG. 3 illustrates a condition corresponding to a partially full fluid tank. FIG. 4 illustrates a condition corresponding to a substantially empty fluid tank. FIG. 5 illustrates a condition that may arise as the boat is operated at cruising speeds, e.g., as the hull of the boat is no longer level but bow-high. FIG. 6 illustrates a condition that shows random fluctuations in the fluid level due to fluid splashing or sloshing, such as may occur when the boat is rocked up and down along its longitudinal axis. In each of the above situations, it will be appreciated that the actuating angle comprises the angular difference between the circuit housing angle imparted by the first float and the potentiometer arm angle imparted by the second float. As used herein, actuating angle refers to the net angle resulting from the combination of floats 62 and 66 that determines the position of the sliding contact in the potentiometer circuit 60, and that in turn determines that value of the output signal indicative of the fluid level in the tank.

Figure 7:
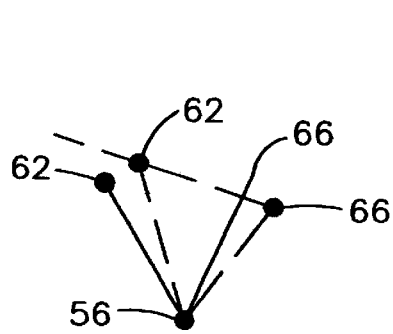
FIG. 7 is a geometric conceptual representation to facilitate understanding of the present invention and illustrating respective actuating angles imparted by the two floats for the same amount of fluid, when the fluid tank is level, and when the fluid tank is tilted.

As shown in FIG. 7, the respective solid lines represent floats 62 and 66 when the fluid tank is level and contains a given amount of fluid. Using the basic principle that the fluid surface will remain level relative to local gravity, that is, the fluid surface will remain normal relative to local gravity regardless of the tank being tilted, then, as represented by the dashed lines in FIG. 7, for the same given amount of fluid, float 62 will rise a corresponding amount while float 66 will fall the same corresponding amount. However, actuating angle provided by float assembly 58 will remain substantially constant regardless of fluid tank tilt or fluid splash in the tank for a given amount of fluid of tank. As depicted in FIGS. 2 through 4, the actuating angle will vary only as a function of fluid level changes corresponding to a decreased/ increased amount of fluid in the tank and not as a function of fluctuation due to tank tilt or fluid splash in the tank.

It will be appreciated that the potentiometer may be chosen to provide a resistance that varies non-linearly relative to the angular position of its rotatable arm. For example, it may be desirable to provide a more sensitive response as the fluid level approaches empty. As suggested above, in the event optional signal conditioning device 70, such as a microprocessor is used, that device may be coupled to receive through connecting leads 72 the output signal from potentiometer circuit 60. The microprocessor may include a memory or a lookup table for compensating any non-linearity in the potentiometer resistance. Further, fluid level display 72 may be connected to the microprocessor to receive and display the compensated output signal from the microprocessor.

Figure 8:
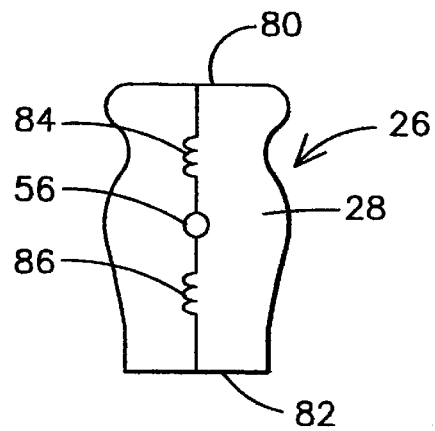
FIG. 8 is an exemplary embodiment of a sensor mount that uses springs and allows for referencing its pivot axis to the center of the fluid tank in lieu of the top and/or bottom of the tank.

As suggested above, and as will be appreciated by those skilled in the art, sensor mount 52 may be mounted onto various interior surfaces of fluid tank 26. As shown in FIG. 8, it will be appreciated that the sensor mount could include biasing means e.g., springs 84 and 86 for positioning and maintaining pivot axis 56 substantially centered relative to respective top and bottom surfaces 80 and 82 of fluid tank 26. Thus, in this embodiment, pivot axis 56 will be maintained at the center of surfaces 80 and 82 independently of whether any or both of surfaces 80 and 82 may expand or contract, for example, as a result of vapor pressure inside the fluid tank, temperature gradients, etc. Further, although in a preferred embodiment, the pivot axis of the float assembly may be aligned to be normal relative to the longitudinal axis of the boat, it will be appreciated that other geometrical arrangements may be implemented. For example, assuming the pivot axis were to be situated at an angle of 45° relative to the boat longitudinal axis, in this case the float assembly would equally pick-up tilt/splash components induced both along the longitudinal axis of the boat as well as tilt/splash components induced perpendicular to the longitudinal axis of the boat. Also depending on the specific configuration of the fluid tank and the arrangements of other components therein, the length of the float arms could be made equal or unequal relative to one another. Any required signal compensation due to any such alternative geometrical arrangements could be readily implemented in the microprocessor using well-understood geometrical relationships to those of ordinary skill in the art.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A fluid level sensor for fluid tank of a marine vessel, the sensor comprising:
   a sensor mount;
   a circuit housing pivotally connected to the mount to pivot about a predetermined pivot axis;
   a float assembly configured to supply an actuating angle substantially impervious to fluid tank tilt and/or fluid splash along an axis generally perpendicular to the pivot axis wherein the float assembly comprises a first float having a respective arm fixedly connected to the circuit housing to impart a housing angle that varies about the pivot axis as the level of fluid about that first float varies; and
   a circuit in the circuit housing responsive to the actuating angle from the float assembly to provide an output signal indicative of the fluid level in the tank.

2. The sensor of claim 1 wherein the circuit in the circuit housing comprises a potentiometer having a rotatable arm.

3. The sensor of claim 2 wherein the float assembly further comprises a second float having a respective arm connected to the rotatable arm of the potentiometer to impart a potentiometer arm angle that varies about the pivot axis relative to the circuit housing as the level of fluid about that second float varies.

4. The sensor of claim 3 wherein the actuating angle comprises the angular difference between the circuit housing angle imparted by the first float and the potentiometer arm angle imparted by the second float.

5. The sensor of claim 1 wherein the sensor mount comprises biasing means for positioning the pivot axis substantially centered relative to respective top and bottom surfaces of the fluid tank.

6. The sensor of claim 2 wherein the potentiometer comprises a resistance that varies non-linearly relative to the angular position of its rotatable arm.

7. The sensor of claim 6 further comprising a microprocessor (e.g., 70) coupled to receive the circuit output signal, the microprocessor including a look-up table for compensating any non-linearity in the potentiometer resistance.

8. The sensor of claim 7 wherein the respective arm of the first float is selected to have the same length relative to the arm of the second float.

9. The sensor of claim 7 herein the respective arm of the first float is selected to have a different length relative to the arm of the second float.

10. The sensor of claim 1 wherein the pivot axis is situated substantially perpendicular relative to a longitudinal axis of the vessel.

11. The sensor of claim 1 wherein the fluid is selected from the group consisting of fuel and oil.

12. A fluid metering system for a marine vessel, the metering system comprising:
   a fluid tank;
   a mount in the fluid tank;
   a circuit housing pivotally connected to the mount to pivot about a predetermined pivot axis;
   a float assembly configured to supply an actuating angle substantially impervious to fluid tank tilt at least along an axis generally perpendicular to the pivot axis wherein the float assembly comprises a first float having a respective arm fixedly connected to the circuit housing to impart a housing angle that varies about the pivot axis as the level of fluid about that first float varies; and
   a circuit in the circuit housing responsive to the actuating angle from the float assembly to provide an output signal indicative of the fluid level in the tank.

13. The fluid metering system of claim 12 wherein the circuit in the circuit housing comprises a potentiometer having a rotatable arm.

14. The fluid metering system of claim 13 wherein the float assembly further comprises a second float (66) having a respective arm (68) connected to the rotatable arm of the potentiometer to impart a potentiometer arm angle that varies about the pivot axis relative to the circuit housing as the level of fluid about that second float varies.

15. The fluid metering system of claim 14 wherein the actuating angle comprises the angular difference between the circuit housing angle imparted by the first float and the potentiometer arm angle imparted by the second float.

16. The fluid metering system of claim 12 wherein the mount comprises biasing means (e.g., 84 and 86) for positioning the pivot axis substantially centered relative to respective top and bottom surfaces of the fluid tank.

17. The fluid metering system of claim 13 wherein the potentiometer comprises a resistance that varies non-linearly relative to the angular position of its rotatable arm.

18. The fluid metering system of claim 17 further comprising a microprocessor (e.g., 70) coupled to receive the circuit output signal, the microprocessor including a look-up table for compensating any non-linearity in the potentiometer resistance.

19. The fluid metering system of claim 18 wherein the respective arm of the first float is selected to have the same length relative to the arm of the second float.

20. The fluid metering system of claim 18 wherein the respective arm of the first float is selected to have a different length relative to the arm of the second float.

21. The fluid metering system of claim 12 wherein the pivot axis is situated substantially perpendicular relative to a longitudinal axis of the boat.

22. The fluid metering system of claim 12 further comprising a signal conditioning device (e.g., 70) coupled to impart a predetermined signal compensation to the circuit output signal.

23. The fluid metering system of claim 22 further comprising a display unit coupled to the signal conditioning device to receive the compensated output signal.

24. The fluid metering system of claim 12 wherein the fluid comprises fuel or oil.

25. A marine propulsion system comprising:
    a propulsion unit;
    one or more fluid tanks fluidly coupled to supply a respective fluid to the propulsion unit;
    a respective mount in each fluid tank;
    a circuit housing pivotally connected to the mount to pivot about a predetermined pivot axis;
    a float assembly configured to supply an actuating angle substantially impervious to fluid tank tilt and/or fluid splash at least along an axis generally perpendicular to the pivot axis wherein the float assembly comprises a first float having a respective arm fixedly connected to the circuit housing to impart a housing angle that varies about the pivot axis as the level of fluid about that first float varies; and
    a circuit in the circuit housing responsive to the actuating angle from the float assembly to provide an output signal indicative of the fluid level in a respective tank.

26. The propulsion system of claim 25 wherein the circuit in the circuit housing comprises a potentiometer having a rotatable arm.

27. The propulsion system of claim 26 wherein the float assembly further comprises a second float having a respective arm connected to the rotatable arm of the potentiometer to impart a potentiometer arm angle that varies about the pivot axis relative to the circuit housing as the level of fluid about that second float varies.

28. The propulsion system of claim 27 wherein the actuating angle comprises the angular difference between the circuit housing angle imparted by the first float and the potentiometer arm angle imparted by the second float.

29. The propulsion system of claim 25 wherein the mount comprises biasing means for positioning the pivot axis substantially centered relative to respective top and bottom surfaces of a respective fluid tank.

30. The propulsion system of claim 26 wherein the potentiometer comprises a resistance that varies non-linearly relative to the angular position of its rotatable arm.

31. The propulsion system of claim 30 further comprising a microprocessor coupled to receive the circuit output signal, the microprocessor including a look-up table for compensating any non-linearity in the potentiometer resistance.

32. The propulsion system of claim 31 wherein the respective arm of the first float is selected to have the same length relative to the arm of the second float.

33. The propulsion system of claim 31 wherein the respective arm of the first float is selected to have a different length relative to the arm of the second float.

34. The propulsion system of claim 25 wherein the pivot axis is situated substantially perpendicular relative to a longitudinal axis of the boat.

35. The propulsion system of claim 25 further comprising a signal conditioning device coupled to impart a predetermined signal compensation to a respective circuit output signal.

36. The fluid metering system of claim 35 further comprising one or more display units coupled to the signal conditioning device to receive a respective compensated output signal.

37. The fluid metering system of claim 25 wherein the fluid is selected from the group consisting of fuel and oil.

38. A kit for a fluid tank of a marine vessel, the kit comprising:
    a mount;
    a circuit housing pivotally connected to the mount to pivot about a predetermined pivot axis;
    a float assembly configured to supply an actuating angle substantially impervious to fluid tank tilt at least along an axis generally perpendicular to the pivot axis wherein the float assembly comprises a first float having a respective arm fixedly connected to the circuit housing to impart a housing angle that varies about the pivot axis as the level of fluid about that first float varies; and
    a circuit in the circuit housing responsive to the actuating angle from the float assembly to provide an output signal indicative of the fluid level in the tank.

39. The kit of claim 38 wherein the circuit in the circuit housing comprises a potentiometer having a rotatable arm.

40. The kit of claim 39 wherein the float assembly further comprises a second float having a respective arm connected to the rotatable arm of the potentiometer to impart a potentiometer arm angle that varies about the pivot axis relative to the circuit housing as the level of fluid about that second float varies.

41. The kit of claim 40 wherein the actuating angle comprises the angular difference between the circuit housing angle imparted by the first float and the potentiometer arm angle imparted by the second float.

42. The kit of claim 38 wherein the mount comprises biasing means for positioning the pivot axis substantially centered relative to respective top and bottom surfaces of the fluid tank.

43. The kit of claim 39 wherein the potentiometer comprises a resistance that varies non-linearly relative to the angular position of its rotatable arm.

44. The kit of claim 43 further comprising a microprocessor (e.g., 70) coupled to receive the circuit output signal, the microprocessor including a look-up table for compensating any non-linearity in the potentiometer resistance.

45. The kit of claim 44 wherein the respective arm of the first float is selected to have the same length relative to the arm of the second float.

46. The kit of claim 44 wherein the respective arm of the first float is selected to have a different length relative to the arm of the second float.

47. The kit of claim 38 wherein the pivot axis is situated substantially perpendicular relative to a longitudinal axis of the vessel.

48. A method for sensing fluid level in a tank of a marine vessel, the method comprising:

pivotally connecting a circuit housing to a mount in the fluid tank to pivot about a predetermined pivot axis;

generating an actuating angle substantially insensitive to fluid tank tilt and/or fluid splash at least along an axis generally perpendicular to the tilt axis wherein the generating step comprises fixedly connecting a first float to generate a housing angle that varies about the pivot axis as the level of fluid about that first float varies; and providing a circuit in the circuit housing responsive to the actuating angle to provide an output signal indicative of the fluid level in the tank.

49. The method of claim 48 wherein the circuit in the circuit housing comprises a potentiometer having a rotatable arm.

50. The method of claim 49 wherein the generating step further comprises connecting to the rotatable arm of the potentiometer a second float to impart a potentiometer arm angle that varies about the pivot axis relative to the circuit housing as the level of fluid about that second float varies.

51. The method of claim 50 wherein the actuating angle comprises the angular difference between the circuit housing angle imparted by the first float and the potentiometer arm angle imparted by the second float.

52. The method of claim 48 further comprising positioning the pivot axis substantially centered relative to respective top and bottom surfaces of the fluid tank.

53. The method of claim 49 wherein the potentiometer comprises a resistance that varies non-linearly relative to the angular position of its rotatable arm.

54. The method of claim 53 further comprising compensating in the circuit output signal any non-linearities due to the potentiometer resistance.

55. The method of claim 48 wherein the pivot axis is situated substantially perpendicular relative to a longitudinal axis of the vessel.

* * * * *